United States Patent
Zhang

(10) Patent No.: US 11,954,204 B2
(45) Date of Patent: Apr. 9, 2024

(54) ARTIFICIAL INTELLIGENCE AI PROCESSING METHOD AND AI PROCESSING APPARATUS

(71) Applicant: Huawei Technologies Co., Ltd., Shenzhen (CN)

(72) Inventor: Jianyong Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 575 days.

(21) Appl. No.: 17/172,804

(22) Filed: Feb. 10, 2021

(65) Prior Publication Data

US 2021/0165883 A1 Jun. 3, 2021

Related U.S. Application Data

(63) Continuation of application No. PCT/CN2018/100469, filed on Aug. 14, 2018.

(51) Int. Cl.
G06F 21/57 (2013.01)
G06F 9/4401 (2018.01)
G06F 9/445 (2018.01)
G06N 5/04 (2023.01)

(52) U.S. Cl.
CPC ............ G06F 21/57 (2013.01); G06F 9/4401 (2013.01); G06F 9/4411 (2013.01); G06F 9/445 (2013.01); G06N 5/04 (2013.01)

(58) Field of Classification Search
CPC ...... G06F 21/57; G06F 9/4401; G06F 9/4411; G06F 9/445
See application file for complete search history.

(56) References Cited

U.S. PATENT DOCUMENTS

| | | | |
|---|---|---|---|
| 11,422,688 B2 * | 8/2022 | Kim | H04M 1/724631 |
| 2015/0089213 A1 * | 3/2015 | Isozaki | H04L 9/0891 |
| | | | 726/17 |
| 2015/0235055 A1 | 8/2015 | An et al. | |
| 2017/0061436 A1 | 3/2017 | Liu et al. | |
| 2017/0164201 A1 * | 6/2017 | Li | G06F 21/57 |
| 2017/0317832 A1 | 11/2017 | Surdu | |
| 2018/0152454 A1 * | 5/2018 | Kwon | H04L 63/045 |
| 2019/0228169 A1 * | 7/2019 | Huang | G06F 12/1441 |
| 2020/0264918 A1 * | 8/2020 | Bai | G06F 1/3234 |

FOREIGN PATENT DOCUMENTS

| | | |
|---|---|---|
| CN | 104125216 A | 10/2014 |
| CN | 104216777 A | 12/2014 |
| CN | 105447406 A | 3/2016 |

(Continued)

*Primary Examiner* — Thaddeus J Plecha
(74) *Attorney, Agent, or Firm* — Slater Matsil, LLP

(57) ABSTRACT

Embodiments of the present invention disclose an AI processing method and an AI processing apparatus. The method is applied to the AI processing apparatus. An AI processor has at least two working modes, and security of the at least two working modes is different. The method includes: processing, by the AI processor, an AI processing request in a target mode. The target mode is one of the at least two working modes, and the target mode is a working mode determined based on the AI processing request. The AI processor has at least two working modes with different security, and may switch between different working modes.

21 Claims, 4 Drawing Sheets

(56) References Cited

FOREIGN PATENT DOCUMENTS

| | | | |
|---|---|---|---|
| CN | 105592019 | A | 5/2016 |
| CN | 105930731 | A | 9/2016 |
| CN | 107067250 | A | 8/2017 |
| CN | 107292177 | A | 10/2017 |
| CN | 107392055 | A | 11/2017 |
| CN | 108140086 | A | 6/2018 |
| CN | 108256850 | A | 7/2018 |

* cited by examiner

ARTIFICIAL INTELLIGENCE AI PROCESSING METHOD AND AI PROCESSING APPARATUS

CROSS-REFERENCE TO RELATED APPLICATIONS

This application is a continuation of International Application No. PCT/CN2018/100469, filed on Aug. 14, 2018, the disclosure of which is hereby incorporated by reference in its entirety.

TECHNICAL FIELD

This application relates to the field of computer technologies, and in particular, to an artificial intelligence AI processing method, an AI processing apparatus, and a storage medium.

BACKGROUND

With emergence of an artificial intelligence (AI) application on a mobile terminal (for example, a mobile phone), a mainstream vendor has started to integrate a dedicated AI processing chip, namely, an AI chip, into the mobile terminal, for example, the mobile phone, to provide basic computing capability for an AI algorithm. An AI algorithm originally processed by using a central processing unit (CPU) or a graphics processing unit (GPU) may be implemented by using a dedicated AI chip. This greatly increases an energy efficiency ratio of AI computing.

Application of the AI chip on the mobile terminal, for example, the mobile phone, also promotes development of an AI service. More AI applications, such as face recognition, intelligent scene recognition, and intelligent gallery classification, are implemented on the mobile terminal. However, some AI applications such as the face recognition involve data security or payment security of a user. Therefore, specific security requirements are imposed on software and hardware execution environments of the AI applications.

Currently, the mobile terminal, for example, the mobile phone, is in an initial phase of supporting running of an AI application. A currently used solution is to use an AI chip deployed in a rich execution environment (REE) to provide services for various AI applications. However, because the REE (for example, Android and iOS) has relatively low security, the AI chip deployed in the REE cannot meet security requirements of the AI applications.

SUMMARY

This application provides an artificial intelligence AI processing method, an AI processing apparatus, and a storage medium, to meet a security requirement of an AI application and increase resource utilization.

According to a first aspect, this application provides an AI processing method, applied to an AI processing apparatus. The AI processing apparatus includes an AI processor. The AI processor has at least two working modes, and security of the at least two working modes is different. The method includes:
the AI processor processes an AI processing request in a target mode, where the target mode is one of the at least two working modes, and the target mode is a working mode determined based on the AI processing request.

Optionally, the AI processor has a secure mode and a normal mode (a non-secure mode), and may switch between the two modes. Security of the AI processor in the secure mode is higher than security of the AI processor in the normal mode.

In this application, the AI processor processes the AI processing request in the target mode corresponding to the AI processing request, to meet security processing requirements of different AI processing requests, and improve security.

In an optional implementation, the AI processing apparatus further includes a controller, and before the AI processor processes the AI processing request in the target mode, the method further includes:
the controller receives the AI processing request.
The controller determines the target mode corresponding to the AI processing request.
The controller may be a CPU, a GPU, or another processor.

In this implementation, the controller determines the target mode corresponding to the AI processing request, so that the AI processor processes the AI processing request in the target mode. This implementation is simple.

In an optional implementation, that the controller determines the target mode corresponding to the AI processing request includes:
the controller determines, based on a service type requested by the AI processing request, the target mode corresponding to the AI processing request.
Alternatively, the controller determines, based on a type of service data carried in the AI processing request, the target mode corresponding to the AI processing request.

The service type requested by the AI processing request may be any one of the following: a media service, an unlocking service, a payment service, and the like.

In this implementation, a working mode that is of the AI processor and that corresponds to the AI processing request can be quickly determined. This implementation is simple.

In an optional implementation, before the AI processor processes the AI processing request in the target mode, the method further includes:
the controller sets the working mode of the AI processor to the target mode.

A working mode of internal components of the AI processor is the working mode of the AI processor. Each internal component of the AI processor has two or more working modes, and security varies in different working modes. For example, each internal component of the AI processor has two working modes: the secure mode and the non-secure mode. Security of the secure mode is higher than security of the non-secure mode.

In this implementation, the controller sets the working mode of the internal components of the AI processor to the target mode corresponding to the AI processing request, so that the AI processor processes the AI processing request in the target mode. This implementation is simple.

In an optional implementation, that the controller sets the working mode of the AI processor to the target mode includes:
the controller sets the working mode of the internal components of the AI processor to the target mode by using a TrustZone protection controller (TZPC).

In actual application, the AI processing apparatus may complete switching of the internal components of the AI processor between a security environment (the secure mode)

and a non-security environment (the non-secure mode) by using the TZPC, namely, the TrustZone protection controller.

In this implementation, the working mode of the internal components of the AI processor can be quickly set to the target mode by using the TZPC. This implementation is simple.

In an optional implementation, that the controller determines the target mode corresponding to the AI processing request includes:

the controller determines a security level corresponding to the AI processing request.

The controller determines that a working mode that is of the AI processor and that corresponds to the security level corresponding to the AI processing request is the target mode.

Different AI processing requests may correspond to different security levels. The security level corresponding to the AI processing request may one-to-one correspond to the working mode of the AI processor. The security level corresponding to the AI processing request is positively correlated with a security requirement of the AI processing request. To be specific, a higher security requirement of the AI processing request indicates a higher security level corresponding to the AI processing request. For example, the AI processing request corresponds to two security levels: a normal level and a secure level. The AI processor has two working modes: the secure mode and the non-secure mode. The working modes correspond to the normal level and the secure level respectively. The AI processor processes an AI processing request at the secure level in the secure mode, and the AI processor processes an AI processing request at the normal level in the non-secure mode.

In this implementation, the working mode of the AI processor can be quickly and accurately determined based on the security level corresponding to the AI processing request. This implementation is simple.

In an optional implementation, before the AI processor processes the AI processing request in the target mode, the method further includes:

the controller initiates the AI processing request to the AI processor.

In this implementation, the controller initiates the AI processing request to the AI processor, so that the AI processor processes the AI processing request in a timely manner. This implementation is simple.

In an optional implementation, the AI processing apparatus supports a rich execution environment REE and a trusted execution environment TEE, and that the controller initiates the AI processing request to the AI processor includes:

when the target mode is a first mode, the controller initiates the AI processing request to the AI processor by using a driver in the TEE;

when the target mode is a second mode, the controller initiates the AI processing request to the AI processor by using a driver in the REE. Security of the AI processor in the first mode is higher than security of the AI processor in the second mode.

The trusted execution environment (TEE) is a running environment that coexists with an REE (usually Android) on a device, and provides a security service for the REE. The TEE has its own execution space, and has a higher security level than the REE. In actual application, each physical CPU core of the AI processing apparatus is provided with two virtual cores. One virtual core is configured to perform an operation in the trusted execution environment (TEE), and is referred to as a secure core. The other virtual core is configured to perform an operation in the non-security environment (REE), and is referred to as a non-secure core. If the CPU runs the secure core, an execution environment of the AI processing apparatus is the TEE. If the CPU runs the non-secure core, the execution environment of the AI processing apparatus is the REE. The AI processor has the corresponding drivers in both the REE and the TEE. It may be understood that when working modes that are of the AI processor and that correspond to two AI processing requests are different, the two AI processing requests are processed by using different processing paths and security policies, and the different processing paths correspond to processing procedures of different software stacks. The processing procedures of the different software stacks have different security. To be specific, a processing procedure with higher security is used for an AI processing request with a higher security requirement. A processing procedure with lower security is used for an AI processing request with a lower security requirement. The controller initiates the AI processing request to the AI processor by using the driver in the TEE, to improve security of processing the AI processing request. The controller initiates the AI processing request to the AI processor by using the driver in the REE, to fully use a resource in the REE, and improve processing efficiency.

In this implementation, the AI processing request is initiated to the AI processor by using a driver corresponding to the target mode corresponding to the AI processing request, so that both efficiency and security of processing the AI processing request can be considered.

In an optional implementation, before the AI processor processes the AI processing request in the target mode, the method further includes:

the controller determines an AI model and AI operator library code required to process the AI processing request.

The controller loads the AI model and the AI operator library code to the AI processor.

That the AI processor processes the AI processing request in the target mode includes:

the AI processor processes the AI processing request in the target mode by using the AI model and the AI operator library code.

Loading the AI model and the AI operator library code to the AI processor may be loading the AI model and the AI operator library code to a target address (a security address) specified by the AI processor. The target address may be a security address preconfigured by the AI processor. To be specific, an address corresponding to memory space with relatively high security is allocated to the AI processor. The AI processor may extract the AI model and the AI operator library code from the target address. Other data required by the AI processor may also be stored in the target address, and when the AI processor needs the data, the AI processor extracts the corresponding data from the target address. To be specific, the data required by the AI processor may be stored in a memory outside the AI processor. In this way, a problem of limited internal storage space of the AI processor can be resolved.

In this implementation, the AI model and the AI operator library code that are required to process the AI processing request are loaded to the AI processor, so that the AI processor processes the AI processing request by using the AI model and the AI operator library code. This implementation is simple.

In an optional implementation, before the controller initiates the AI processing request to the AI processor by using the driver in the TEE, the method further includes:

when a running environment of the controller is the REE, the controller switches the running environment from the REE to the TEE.

In this implementation, the controller switches the running environment from the REE to the TEE, to initiate the AI processing request to the AI processor by using the driver in the TEE. This can improve security of processing the AI processing request.

In an optional implementation, before the controller initiates the AI processing request to the AI processor by using the driver in the REE, the method further includes:

when a running environment of the controller is the TEE, the controller switches the running environment from the TEE to the REE.

In this implementation, the controller switches the running environment from the TEE to the REE, to initiate the AI processing request to the AI processor by using the driver in the REE. This can fully use the resource in the REE, and increase resource utilization.

In an optional implementation, before the AI processor processes the AI processing request in the target mode, the method further includes:

the controller applies for storage space required to process the AI processing request.

The controller sets access permission for the storage space as target access permission by using a memory controller, where the target access permission is access permission determined based on the service type requested by the AI processing request. That the AI processor processes an AI processing request in a target mode includes:

the AI processor processes the AI processing request in the target mode by using the storage space.

In this implementation, the AI processing apparatus sets, based on the service type requested by the AI processing request, the access permission for the storage space required to process the AI processing request. An operation is simple, and security can be further improved.

In an optional implementation, the controller is a central processing unit CPU.

According to a second aspect, this application provides an AI processing apparatus, and the AI processing apparatus includes:

an AI processor, configured to process an AI processing request in a target mode, where the AI processor has at least two working modes, security of the at least two working modes is different, the target mode is one of the at least two working modes, and the target mode is a working mode determined based on the AI processing request.

In this application, the AI processor processes the AI processing request in the target mode corresponding to the AI processing request, to meet security processing requirements of different AI processing requests, and improve security.

In an optional implementation, the AI processing apparatus further includes:

a controller, configured to receive the AI processing request, and determine the target mode corresponding to the AI processing request.

In this implementation, the controller determines the target mode corresponding to the AI processing request, so that the AI processor processes the AI processing request in the target mode. This implementation is simple.

The controller may be a CPU, a GPU, or another processor.

In an optional implementation, the controller is specifically configured to determine, based on a service type requested by the AI processing request, the target mode corresponding to the AI processing request.

Alternatively, the controller is specifically configured to determine, based on a type of service data carried in the AI processing request, the target mode corresponding to the AI processing request.

In this implementation, the target mode corresponding to the AI processing request can be quickly determined. This implementation is simple.

In an optional implementation, the controller is further configured to set the working mode of the AI processor to the target mode.

In this implementation, a working mode of internal components of the AI processor is set to the target mode corresponding to the AI processing request, so that the AI processor processes the AI processing request in the target mode. This implementation is simple.

In an optional implementation, a central processing unit is specifically configured to set the working mode of the internal components of the AI processor to the target mode by using a TrustZone protection controller (TZPC).

In this implementation, the working mode of the internal components of the AI processor can be quickly set to the target mode by using the TZPC. This implementation is simple.

In an optional implementation, the controller is further configured to initiate the AI processing request to the AI processor.

In this implementation, the controller initiates the AI processing request to the AI processor, so that the AI processor processes the AI processing request in a timely manner. This implementation is simple.

In an optional implementation, the AI processing apparatus supports a rich execution environment REE and a trusted execution environment TEE.

The controller is specifically configured to determine a case in which the target mode is a first mode, and initiate the AI processing request to the AI processor by using a driver in the TEE.

The controller is specifically configured to determine a case in which the target mode is a second mode, and initiate the AI processing request to the AI processor by using a driver in the REE. Security of the AI processor in the first mode is higher than security of the AI processor in the second mode.

In this implementation, the AI processing request is initiated to the AI processor by using a driver corresponding to the target mode corresponding to the AI processing request, so that both efficiency and security of processing the AI processing request can be considered.

In an optional implementation, the controller is further configured to determine an AI model and AI operator library code required to process the AI processing request, and load the AI model and the AI operator library code to the AI processor.

The AI processor is specifically configured to process the AI processing request by using the AI model and the AI operator library code.

In this implementation, the AI model and the AI operator library code that are required to process the AI processing request are loaded to the AI processor, so that the AI processor processes the AI processing request by using the AI model and the AI operator library code. This implementation is simple.

In an optional implementation, the controller is further configured to: when a running environment of the controller is the REE, switch the running environment from the REE to the TEE.

In this implementation, the controller switches the running environment from the REE to the TEE, to initiate the AI processing request to the AI processor by using the driver in the TEE. This can improve security of processing the AI processing request.

In an optional implementation, the controller is further configured to: when a running environment of the controller is the TEE, switch the running environment from the TEE to the REE.

In this implementation, the controller switches the running environment from the TEE to the REE, to initiate the AI processing request to the AI processor by using the driver in the REE. This can fully use a resource in the REE, and increase resource utilization.

In an optional implementation, the controller is further configured to apply for storage space required to process the AI processing request, and set, by using a memory controller, access permission for the storage space as target access permission. The target access permission is access permission determined based on the service type requested by the AI processing request.

The AI processor is specifically configured to process the AI processing request in the target mode by using the storage space.

In this implementation, the AI processing apparatus sets, based on the service type requested by the AI processing request, the access permission for the storage space required to process the AI processing request. An operation is simple, and security can be further improved.

In an optional implementation, the controller is a central processing unit CPU.

According to a third aspect, an embodiment of the prevent invention provides a computer-readable storage medium. The computer storage medium stores a computer program, and the computer program includes a program instruction. When the program instruction is executed by a processor, the processor is enabled to perform the method according to any one of the first aspect and the implementations.

DETAILED DESCRIPTION OF ILLUSTRATIVE EMBODIMENTS

Figure 1:
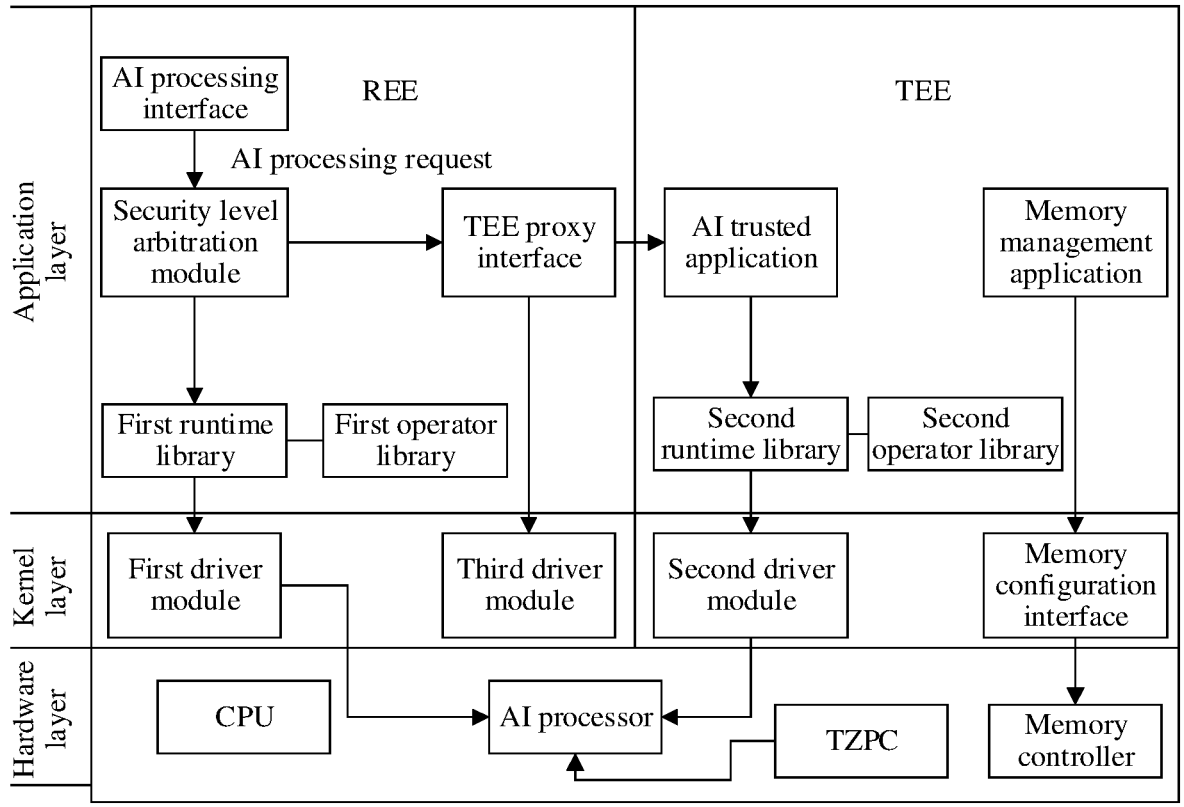
FIG. 1 is a schematic structural diagram of a system architecture of an AI processing apparatus according to this application.

Terms used in implementations of the present invention are merely intended to explain specific embodiments of the present invention, but are not intended to limit the present invention.

Technical solutions described in the background cannot meet security requirements of AI applications. This application provides an AI processing method and an AI processing apparatus, to support AI applications with different security requirements. The AI processing apparatus provided in this application may be an apparatus including an AI processor (AI chip) or an AI chip, for example, a mobile phone, a tablet computer, a wearable device, a notebook computer, or a smart camera.

The following first describes some terms and related knowledge in this application.

A TEE is a running environment that coexists with an REE on a mobile device (for example, the mobile phone). A rich operating system (Rich OS) is usually an iOS system of an iPhone or an Android system, and runs in the REE The TEE includes trusted software and hardware resources such as a processor core, a secure memory, a trusted user interface (TUI), a trusted operating system (Trusted OS), and a trusted application (TA), to construct trusted execution space that is more secure than the REE. To ensure security of a TEE resource, a GlobalPlatform (GP) standard specifies that some resources that can be accessed by the REE can also be accessed by the TEE. Conversely, unless explicitly authorized by the TEE, a trusted resource in the TEE can be accessed only by another trusted resource. In this way, in this closed and trusted space environment isolated from the Rich OS, personal information and electronic payment of a user can be more securely stored and processed, and a security service is provided for the Rich OS. It may be understood that security of the TEE is higher than security of the REE In other words, a security level of the TEE is higher than a security level of the REE.

A TrustZone protection controller (TZPC) may dynamically configure a peripheral device in a security environment or in a non-security environment. The TZPC can implement the following functions: controlling a security attribute of the peripheral device through an advanced microcontroller bus architecture (AMBA) bus; and identifying a status (secure or non-secure) of a current processing process and switching between the security environment and the non-security environment. Therefore, the TZPC can control the security attribute of the peripheral device through the AMBA bus.

The AI processor is interconnected with an external component through an AMBA protocol bus. An access type of the AI processor is classified into a master mode and a slave mode. As a master device, the AI processor initiates bus access, and an access object is another component on the bus. As a slave device, another component initiates bus access, and an access object is the AI processor. The TZPC uniformly controls security attributes of access in the two directions. Internal components of the AI processor, such as a static random access memory (SRAM), an AI coprocessor, and a random access memory (RAM), are used as a whole to set or switch a security state at an external interface of the AI processor. In other words, a working mode of the internal components of the AI processor is set or switched. Optionally, the internal components of the AI processor are used as a whole to switch, by using the TZPC, the security state at an interface of connecting the AI processor to the bus, instead of performing security control by the internal components respectively according to a general design. In other words, the TZPC sets or switches a working mode of the AI processor.

FIG. 1 is a schematic structural diagram of a system architecture of an AI processing apparatus according to this application. As shown in FIG. 1, the system architecture is divided into a hardware layer, a kernel layer, and an application layer.

The application layer includes REE-side components (components in a non-security domain) and TEE-side components (components in a security domain). The REE-side components at the application layer may include: an AI processing interface, configured to receive an AI processing request, and transmit the received AI processing request to a security level arbitration module; the security level arbitration module, configured to determine a working mode that is of an AI processor and that corresponds to the AI processing request, and forward the AI processing request based on the working mode that is of the AI processor and that corresponds to the AI processing request; a first runtime library, configured to provide runtime support for the AI processor; a first operator library, configured to provide an algorithm code segment required by the AI processor to execute an AI algorithm; and a TEE proxy interface, configured to transfer the AI processing request to a TEE for processing, to be specific, provide a proxy service for the AI processing request. The TEE-side components at the application layer may include: an AI trusted application, configured to provide a security AI algorithm service; a second runtime library, configured to provide runtime support for the AI processor; a second operator library, configured to provide an algorithm code segment required by the AI processor to execute an AI algorithm; and a memory management application, configured to configure a memory controller through a memory configuration interface. The AI processing interface is a software interface providing an AI computing service, namely, an AI processing request entry. Both the REE-side components and the TEE-side components at the application layer are software or software interfaces. A CPU can implement a function of each component at the application layer.

The kernel layer includes REE-side components (components in the non-security domain) and TEE-side components (components in the security domain). The REE-side components at the kernel layer may include: a first driver module, configured to provide a driver service for the AI processor; and a third driver module, configured to implement switching between an REE and the TEE. The REE-side components at the kernel layer may include: a second driver module, configured to provide a driver service for the AI processor; and the memory configuration interface, configured to configure the memory controller according to an instruction sent by the memory management application.

The hardware layer may include the CPU, the AI processor, the memory controller, and a TZPC. Each of the CPU and the AI processor has two or more working modes, and can switch between different working modes. For example, the CPU may work in both the TEE and the REE. The AI processor has two working modes: a first mode and a second mode. Security of the AI processor in the second mode is higher than security of the AI processor in the first mode. The memory controller is configured to control access permission for a memory resource. The TZPC is configured to set a security state of internal components of the AI processor, in other words, set the working mode of the AI processor.

It may be learned from FIG. 1 that the security level arbitration module determines whether to process the AI processing request in the TEE or in the REE. The AI processor may process an AI processing request in the REE, and may also process an AI processing request in the TEE. Based on the system architecture in FIG. 1, the AI processing apparatus may process AI processing requests by using different processing procedures. Specifically, a unified AI processing request entry (the AI processing interface) is provided in the REE. After determining working modes that are of the AI processor and that correspond to the AI processing requests, the security level arbitration module distributes the AI processing requests, to be specific, directs the AI processing requests to corresponding execution environments for processing. To be specific, the security level arbitration module determines whether to process the AI processing request in the TEE or in the REE For example, if the security level arbitration module determines that the AI processing request corresponds to the first mode of the AI processor, the AI processing apparatus processes the AI processing request in the REE, and the AI processor works in the first mode. If the security level arbitration module determines that the AI processing request corresponds to the second mode of the AI processor, the AI processing apparatus processes the AI processing request in the TEE, and the AI processor works in the second mode. Security of the AI processor in the second mode is higher than security of the AI processor in the first mode.

Figure 2:
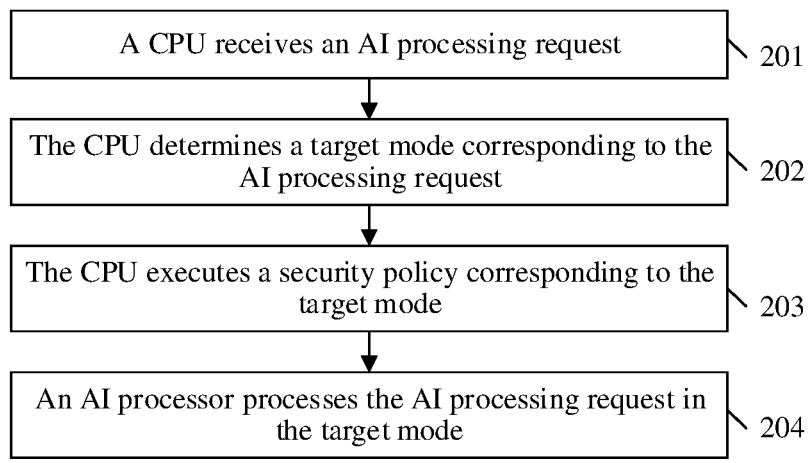
FIG. 2 is a flowchart of an AI processing method according to this application.

Based on the system architecture in FIG. 1, this application provides an AI processing method, applied to an AI processing apparatus. The AI processing apparatus includes an AI processor and a CPU. The AI processor has at least two working modes, and security of the at least two working modes is different. As shown in FIG. 2, the method may include the following steps.

201: The CPU receives an AI processing request.

The AI processor and the CPU may be two independent components, or may be integrated into one integrated circuit. The AI processor may also be the CPU.

202: The CPU determines a target mode corresponding to the AI processing request.

The target mode is included in the at least two working modes.

203: The CPU executes a security policy corresponding to the target mode.

The security policy corresponding to the target mode may include: configuring a running environment of the CPU (an environment outside the AI processor), setting access permission for storage space occupied by the AI processor to process the AI processing request, and the like. Specifically, the AI processing apparatus may store a correspondence between a working mode of the AI processor and a security policy, and a security policy corresponding to each working mode of the AI processor may be determined by using the correspondence. For example, when the AI processor works in a first mode, a security policy executed by the CPU includes configuring the running environment of the CPU as the TEE and setting the storage space occupied to process the AI processing request as a secure memory. When the AI processor works in a second mode, a security policy executed by the CPU includes configuring the running environment of the CPU as an REE and setting the storage space occupied to process the AI processing request as a normal memory. Security of the first mode is higher than security of the second mode, and security of the secure memory is higher than security of the normal memory.

204: The AI processor processes the AI processing request in the target mode.

The AI processor may be an AI chip, an NPU, a GPU, a CPU, or the like, or may be an AI chip or an NPU integrated into a CPU or a GPU. Optionally, the AI processor has a secure mode and a normal mode (a non-secure mode), and may switch between the two modes. The AI processor may run working modes with different security at different times.

In an optional implementation, before the AI processor processes the AI processing request in the target mode, the method further includes:

the CPU sets the working mode of the AI processor to the target mode.

A working mode of internal components of the AI processor is the working mode of the AI processor. Each internal component of the AI processor has two or more working modes, and security varies in different working modes. For example, each internal component of the AI processor has two working modes: the secure mode and the non-secure mode. Security of the secure mode is higher than security of the non-secure mode. The internal components of the AI processor may include an SRAM, an AI coprocessor, a RAM, and the like.

Figure 3:
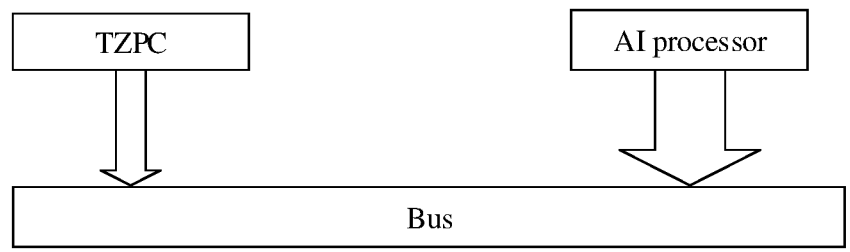
FIG. 3 is a schematic diagram of a connection between an AI processor and a TZPC according to this application.

Specifically, the CPU sets the working mode of the AI processor to the target mode by using a TZPC. In actual application, the internal components of the AI processor may be used as a whole to set or switch, by using the TZPC, a security state at an interface of connecting the AI processor to a bus. Read and write access of the TZPC is implemented in the TEE to ensure that the working mode of the AI processor is securely set. FIG. 3 is a schematic diagram of a connection between the AI processor and the TZPC according to this application. As shown in FIG. 3, both the AI processor and the TZPC are connected to a bus, for example, an AMBA bus. The CPU of the AI processing apparatus may configure, by using the TZPC, the working mode (the security state) of the AI processor, namely, the working mode of the internal components of the AI processor.

Optionally, the working mode of the internal components of the AI processor includes the secure mode and the non-secure mode. The security level of the internal components of the AI processor in the secure mode is the same as a security level of the TEE. The security level of the internal components of the AI processor in the non-secure mode is the same as a security level of the REE The security level of the TEE is higher than that of the REE. Switching of the internal components of the AI processor between the secure mode and the non-secure mode may be understood as switching of the AI processor between the TEE (a security environment) and the REE (a non-security environment). When the internal components of the AI processor work in the secure mode, it may be considered that the AI processor works in the TEE, to be specific, processes the AI processing request in the TEE. When the internal components of the AI processor work in the non-secure mode, it may be considered that the AI processor works in the REE, to be specific, processes the AI processing request in the REE.

Optionally, the working mode of the internal components of the AI processor includes the normal mode, a protection mode, and the secure mode, and security levels of the three working modes are a normal level, a protection level, and a secure level in sequence. A security level of the internal components of the AI processor in the normal mode is the same as the security level of the REE. A security level of the internal components of the AI processor in the secure mode is the same as the security level of the TEE. A security level of the internal components of the AI processor in the protection mode is between the security level of the TEE and the security level of the REE.

TABLE 1

| Working mode of the AI processor | Running environment | Access relationship |
| --- | --- | --- |
| Normal mode | REE | The AI processor and the REE can access each other in the normal mode |
| Protection mode | REE | The AI processor cannot access the TEE in the protection mode, but the TEE can access the AI processor in the protection mode |
| Secure mode | TEE | The AI processor and the TEE can access each other in the secure mode |

Table 1 shows an access relationship between a security level of the AI processor and a running environment of the AI processing apparatus. It may be learned from Table 1 that the AI processor can access software and hardware resources in the REE in the normal mode, and software and hardware in the REE can access the AI processor in the normal mode. The AI processor cannot access software and hardware resources in the TEE in the protection mode, but software and hardware in the TEE can access the AI processor in the protection mode. The AI processor can access software and hardware resources in the TEE in the secure mode, and software and hardware in the TEE can access the AI processor in the secure mode. When the internal components of the AI processor work in the secure mode, it may be considered that the AI processor works in the TEE, to be specific, processes the AI processing request in the TEE. When the internal components of the AI processor work in the normal mode, it may be considered that the AI processor works in the REE, to be specific, processes the AI processing request in the REE. When the internal components of the AI processor work in the protection mode, it may be considered that the AI processor works in the REE, to be specific, processes the AI processing request in the REE, and takes a specific security policy. For example, the AI processor processes the AI processing request by occupying a memory that is more secure than a memory occupied in the normal mode. The access relationship is set, so that the working mode of the AI processor and the running environment of the AI processing apparatus can be properly combined, to meet security requirements of different AI processing requests.

In this implementation, the working mode of the internal components of the AI processor can be quickly set to the target mode by using the TZPC. This implementation is simple.

In this application, the AI processor processes the AI processing request in the target mode corresponding to the AI processing request, to meet security processing requirements of different AI processing requests, and improve security.

In actual application, the CPU in the AI processing apparatus may determine a working mode to be used by the AI processor to process the AI processing request. The following provides specific descriptions.

In an optional implementation, the AI processing apparatus further includes the central processing unit CPU. Before the AI processor processes the AI processing request in the target mode, the method further includes:

the CPU receives the AI processing request.

The CPU determines the target mode corresponding to the AI processing request.

The AI processor and the CPU may be two independent components, or may be integrated into one integrated circuit. The AI processor may also be the CPU. That the CPU receives the AI processing request may be that the CPU receives the AI processing request through an AI processing interface. Optionally, the AI processing apparatus provides a unified AI processing request entry in the REE, for example, the AI processing interface in FIG. 1. The AI processing request entry is configured to receive the AI processing request. After receiving the AI processing request, the AI processing request entry sends the AI processing request to a security level arbitration module. Specifically, the AI processing request entry is configured to receive an AI processing request initiated by an AI application or another application.

That the CPU determines the target mode corresponding to the AI processing request may be that the CPU determines, based on a service type requested by the AI processing request, the target mode corresponding to the AI processing request; or may be that the CPU may determine, based on a type of service data carried in the AI processing request, the target mode corresponding to the AI processing request. To be specific, the CPU may determine, based on the service type requested by the AI processing request, the working mode to be used by the AI processor to process the AI processing request, or may determine, based on the type of the service data carried in the AI processing request, the working mode to be used by the AI processor to process the AI processing request. The service data carried in the AI processing request may be data to be processed by the AI processor, namely, data that needs to be input to the AI processor for AI processing. For example, the AI processing request is used to request to perform AI recognition on face data carried in the AI processing request. The face data is the service data carried in the AI processing request.

Optionally, the security level arbitration module determines, based on the service type requested by the AI processing request or the type of the service data carried in the AI processing request, the working mode that is of the AI processor and that corresponds to the AI processing request. Specifically, the AI processing apparatus may prestore a correspondence between a service type requested by an AI processing request and a working mode of the AI processor, and may determine, by using the correspondence, a working mode that is of the AI processor and that corresponds to each AI processing request. Alternatively, the AI processing apparatus may prestore a correspondence between a type of service data carried in an AI processing request and a working mode of the AI processor, and may determine, by using the correspondence, a working mode that is of the AI processor and that corresponds to each AI processing request. Optionally, the security level arbitration module determines, based on a service type identifier carried in the AI processing request, the working mode that is of the AI processor and that corresponds to the AI processing request. The type of the service data carried in the AI processing request may be classified into a normal type, a protection type, and a secure type. The normal type, the protection type, and the secure type correspond to data in a normal data domain, data in a protection data domain, and data in a secure data domain in sequence. The data in the normal data domain refers to data in storage space whose access permission is the normal level. The data in the protection data domain refers to data in storage space whose access permission is the protection level. The data in the secure data domain refers to data in storage space whose access permission is the secure level. Permission required to access the storage space at the secure level is higher than permission required to access the storage space at the protection level, and the permission required to access the storage space at the protection level is higher than permission required to access the storage space at the normal level.

That the CPU determines the target mode corresponding to the AI processing request may alternatively be that the CPU determines a security level corresponding to the AI processing request, and that the CPU determines that a working mode that is of the AI processor and that corresponds to the security level corresponding to the AI processing request is the target mode.

Different AI processing requests may correspond to different security levels. The security level corresponding to the AI processing request may one-to-one correspond to the working mode of the AI processor. Any AI processing request corresponds to only one security level. The security level corresponding to the AI processing request is positively correlated with a security requirement of the AI processing request. To be specific, a higher security requirement of the AI processing request indicates a higher security level corresponding to the AI processing request. For example, the AI processing request corresponds to two security levels: a normal level and a secure level. The AI processor has two working modes: the secure mode and the non-secure mode. The working modes correspond to the normal level and the secure level respectively. The AI processor processes an AI processing request at the secure level in the secure mode, and the AI processor processes an AI processing request at the normal level in the non-secure mode.

Determining the security level corresponding to the AI processing request may be determining, based on the service type requested by the AI processing request, the security level corresponding to the AI processing request. The AI processing apparatus may prestore a correspondence between a service type requested by an AI processing request and a security level, and may determine, by using the correspondence, a security level corresponding to each AI processing request. Table 2 shows a correspondence between a service type requested by an AI processing request and a security level. Security of a first level, a second level, and a third level increases in sequence. Optionally, the first level is the same as the security level of the REE, the third level is the same as the security level of the TEE, and the second level is between the first level and the third level. In actual application, a security level corresponding to an AI processing request of each service type may be preset based on an actual requirement. This is not limited in this application.

TABLE 2

| Service type requested by the AI processing request | Security level |
| --- | --- |
| Normal service | First level |
| Unlocking service | Second level |
| Payment service | Third level |

Determining the security level corresponding to the AI processing request may be determining, based on the type of the service data carried in the AI processing request, the security level corresponding to the AI processing request. The AI processing apparatus may prestore a correspondence between a type of service data carried in an AI processing request and a security level, and may determine, by using the correspondence, a security level corresponding to each AI processing request.

In this implementation, the CPU determines the target mode corresponding to the AI processing request, so that the AI processor processes the AI processing request in the target mode. This implementation is simple.

In an optional implementation, before the AI processor processes the AI processing request in the target mode, the method further includes:

the controller initiates the AI processing request to the AI processor.

The running environment of the CPU includes two types: the TEE and the REE. In other words, the AI processing apparatus supports the REE and the TEE. Working modes of the AI processor are different, so that the CPU initiates AI processing requests to the AI processor by using drivers in different running environments. In actual application, a specific implementation in which the CPU may initiate the AI processing requests to the AI processor by using different drivers based on the working modes of the AI processor is as follows:

When the target mode is the first mode, the CPU initiates the AI processing request to the AI processor by using a driver in the TEE.

When the target mode is the second mode, the CPU initiates the AI processing request to the AI processor by using a driver in the REE, where the security of the AI processor in the first mode is higher than the security of the AI processor in the second mode.

Optionally, when the target mode is the first mode, the CPU configures the running environment as the TEE. Specifically, when the running environment of the CPU is the REE, the CPU switches the running environment from the REE to the TEE. When the running environment of the CPU is the TEE, the running environment of the CPU remains unchanged. Optionally, when the target mode is the second mode, the CPU configures the running environment as the REE Specifically, when the running environment of the CPU is the TEE, the CPU switches the running environment from the TEE to the REE. When the running environment of the CPU is the REE, the running environment of the CPU remains unchanged.

Figure 4:
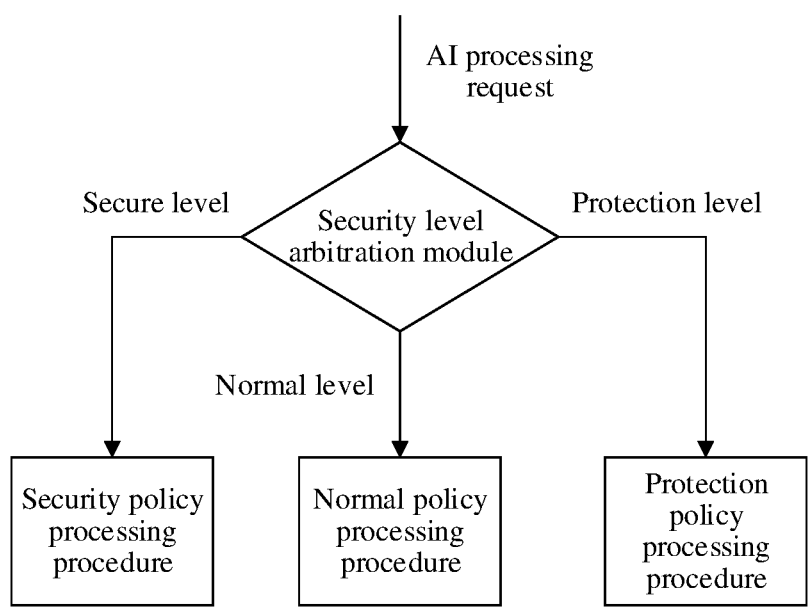
FIG. 4 is a schematic diagram of determining a processing procedure corresponding to an AI processing request according to this application.

The AI processor has corresponding driver modules in both the REE and the TEE. Security of the driver module in the REE is lower than security of the driver module in the TEE, and efficiency of initiating the AI processing request by using the driver module in the REE to the AI processor is higher than efficiency of initiating the AI processing request by using the driver module in the TEE. The working mode of the AI processor is set by the CPU. The CPU initiates the AI processing request to the AI processor by using the corresponding driver module, and loads data required by the AI processor to process the AI processing request. It may be learned that the running environment of the CPU, a manner in which the CPU initiates the AI processing request to the AI processor, a manner in which the CPU loads the data to the AI processor, and the like affect security of processing the AI processing request by the AI processing apparatus. It may be understood that when working modes that are of the AI processor and that correspond to two AI processing requests are different, the two AI processing requests are processed by using different processing paths, and the different processing paths correspond to processing procedures of different software stacks. The processing procedures of the different software stacks have different security. To be specific, a processing procedure with higher security is used for an AI processing request with a higher security requirement. A processing procedure with lower security is used for an AI processing request with a lower security requirement. FIG. 4 is a schematic diagram of determining a processing procedure corresponding to the AI processing request according to this application. As shown in FIG. 4, the AI processing request corresponds to three security levels: a normal level, a protection level, and a secure level. Security of the three security levels increases in sequence, and any AI processing request corresponds to only one security level. The security level arbitration module determines a processing procedure corresponding to the AI processing request. As shown in FIG. 4, the AI processing apparatus processes an AI processing request at the normal level by using a normal policy processing procedure, processes an AI processing request at the protection level by using a protection policy processing procedure, and processes an AI processing request at the secure level by using a security policy processing procedure. Security of the normal policy processing procedure, the protection policy processing procedure, and the security policy processing procedure increases in sequence. For example, in the security policy processing procedure, the CPU sets the working mode of the AI processor to the first mode, and initiates an AI processing request to the AI processor by using the driver in the TEE, and the AI processor processes the AI processing request in the first mode. In the normal policy processing procedure, the CPU sets the working mode of the AI processor to the second mode, and initiates an AI processing request to the AI processor by using the driver in the REE, and the AI processor processes the AI processing request in the second mode by using the normal memory. In the protection policy processing procedure, the CPU sets the working mode of the AI processor to the second mode, and initiates an AI processing request to the AI processor by using the driver in the REE, and the AI processor processes the AI processing request in the second mode by using a protected memory. The security of the first mode is higher than the security of the second mode, and security of the normal memory is lower than security of the protected memory.

In this implementation, the AI processing request is initiated to the AI processor by using the driver corresponding to the target mode corresponding to the AI processing request, so that both efficiency and security of processing the AI processing request can be considered.

In the foregoing embodiments, a problem of the storage space occupied to process the AI processing request is not described. The following describes how to apply for the storage space occupied to process the AI processing request and set the access permission for the storage space.

In an optional implementation, before the AI processor processes the AI processing request in the target mode, the method further includes:

the CPU applies for the storage space required to process the AI processing request.

The CPU sets the access permission for the storage space as target access permission by using a memory controller, where the target access permission is access permission determined based on the service type requested by the AI processing request.

That the AI processor processes the AI processing request in the target mode includes:

the AI processor processes the AI processing request in the target mode by using the storage space.

The access permission for the storage space occupied by the AI processing apparatus to process the AI processing request corresponds to the service type requested by the AI processing request. The AI processing apparatus may store a correspondence between a service type requested by an AI processing request and access permission, and the CPU may determine, by using the correspondence, access permission for storage space required by the AI processor to process each AI processing request. Access permission for a memory resource of the AI processing apparatus may include two types: a secure access permission and a normal access permission. The memory resource may be classified into the secure memory and the normal memory. Accessing the secure memory requires the secure access permission. Accessing the normal memory requires either the secure access permission or the normal access permission. For example, when a service requested by the AI processing request is a media service, the normal memory needs to be used, and the CPU sets the access permission for the applied storage space to the normal access permission by using the memory controller. When a service requested by the AI processing request is a payment service, the secure memory needs to be used, and the CPU sets the access permission for the applied storage space to the secure access permission by using the memory controller. The access permission for the memory resource of the AI processing apparatus may include three types: the secure access permission, a protection access permission, and the normal access permission. The memory resource may be classified into the secure memory, the protected memory, and the normal memory. Accessing the secure memory requires the secure access permission. Accessing the protected memory requires the secure access permission or the protection access permission. Accessing the normal memory requires any one of the secure access permission, the protection access permission, or the normal access permission. For example, when a service requested by the AI processing request is a first-type service, the normal memory needs to be used, and the CPU sets the access permission for the applied storage space to the normal access permission. When a service requested by the AI processing request is a second-type service, the protected memory needs to be used, and the CPU sets the access permission for the applied storage space to the protection access permission. When a service requested by the AI processing request is a third-type service, the secure memory needs to be used, and the CPU sets the access permission for the applied storage space to the secure access permission. Security requirements of the first-type service, the second-type service, and the third-type service on storage space increase in sequence.

TABLE 3

| Access permission | Normal memory | Protected memory | Secure memory |
| --- | --- | --- | --- |
| Security access permission | Readable and writable | Configurable, and readable and writable by default | Configurable, and readable and writable by default |
| Protection access permission | Readable and writable | Configurable, and readable and writable by default | Unreadable and unwritable |
| Normal access permission | Readable and writable | Unreadable and unwritable | Unreadable and unwritable |

It may be learned from Table 3 that the secure access permission can be used to access the various types of memories, the normal access permission can be used to access only the normal memory, and the protection access permission can be used to access the normal memory and the protected memory.

In this implementation, the AI processing apparatus sets, based on the service type requested by the AI processing request, the access permission for the storage space required to process the AI processing request. An operation is simple, and security can be further improved.

The AI processor needs to process an AI processing request by using an AI model and AI operator library code corresponding to the AI processing request. The following describes an implementation in which the CPU loads the AI model and the AI operator library code to the AI processor.

In an optional implementation, before the AI processor processes the AI processing request in the target mode, the method further includes:

the CPU determines the AI model and the AI operator library code that are required to process the AI processing request.

The CPU loads the AI model and the AI operator library code to the AI processor.

That the AI processor processes the AI processing request in the target mode includes:

the AI processor processes the AI processing request in the target mode by using the AI model and the AI operator library code.

Optionally, before the CPU loads the AI operator library code to the AI processor, the CPU verifies the AI operator library code. For example, before loading the AI operator library code to the AI processor, the CPU performs hash verification on the AI operator library code. After the AI operator library code is verified, the CPU loads the AI operator library code to the AI processor. If the verification of the AI operator library code succeeds, the AI processing apparatus continues to process the AI processing request. If the verification of the AI operator library code fails, the AI processing apparatus stops processing the AI processing request. Optionally, before the CPU loads the AI model to the AI processor, the CPU verifies a signature of the AI model. After the signature of the AI model is verified, the CPU loads the AI model to the AI processor. Hash verification is performed on the AI operator library code to ensure that algorithm code used by the AI processor for computing is complete and cannot be spoofed. Verifying the signature of the AI model can ensure integrity of the AI model.

Loading the AI model and the AI operator library code to the AI processor may be loading the AI model and the AI operator library code to a target address (a security address) specified by the AI processor. The target address may be a security address preconfigured by the AI processor. To be specific, an address corresponding to memory space with relatively high security is allocated to the AI processor. The AI processor may extract the AI model and the AI operator library code from the target address. Other data required by the AI processor may also be stored in the target address, and when the AI processor needs the data, the AI processor extracts the corresponding data from the target address. To be specific, the data required by the AI processor may be stored in a memory outside the AI processor. In this way, a problem of limited internal storage space of the AI processor can be resolved.

In this implementation, the AI model and the AI operator library code that are required to process the AI processing request are loaded to the AI processor, so that the AI processor processes the AI processing request by using the AI model and the AI operator library code. This implementation is simple.

In actual application, the AI processing apparatus may not only adjust the working mode of the AI processor to meet security requirements of different AI processing requests, but also improve security of processing the AI processing request with reference to another security policy. The security policy combined with the working mode of the AI processor may include: configuring the running environment of the CPU (the external environment of the AI processor), setting the access permission for the storage space occupied by the AI processor to process the AI processing request, verifying AI operator library code to be used by the AI processor to process the AI processing request, and the like.

Optionally, the CPU determines, based on the security level corresponding to the AI processing request, a security policy that needs to be executed to process the AI processing request, and executes the security policy. Table 4 shows a correspondence between a security level corresponding to an AI processing request, a service type requested by the AI processing request, a security level of an AI processor, and a security policy required by an AI processing apparatus.

TABLE 4

| Security level corresponding to the AI processing request | Service type | Security level of the AI processor | Security policy |
|---|---|---|---|
| First level | Normal service | Normal level | REE + normal memory |
| Second level | Unlocking service | Protection level | REE + protected memory + AI security policy |
| Third level | Payment service | Secure level | TEE + secure memory + AI security policy |

It may be learned from Table 4 that the first level, the second level, and the third level corresponding to the AI processing requests correspond to the normal level, the protection level, and the secure level of the AI processor in sequence. The first level, the second level, and the third level corresponding to the AI processing requests correspond to the normal service, the unlocking service, and the payment service in sequence. Security of the first level, the second level, and the third level increases in sequence. It may be further learned from Table 4 that AI processing requests at different security levels correspond to different security policies. It may be understood that, when the AI processing apparatus processes an AI processing request at the first-level, the CPU uses the normal memory for processing in the REE, and the AI processor works in the first mode. When the AI processing apparatus processes an AI processing request at the second-level, the CPU uses the protected memory for processing in the REE and executes the AI security policy corresponding to the second level, and the AI processor works in the second mode. When the AI processing apparatus processes an AI processing request at the third level, the CPU uses the secure memory for processing in the REE and executes the AI security policy corresponding to the third level, and the AI processor works in the second mode. The AI processor working in the second mode is more secure than the AI processor working in the first mode. In actual application, the AI processing apparatus may combine policies based on service types with different security strength requirements, to form security protection levels from high to low. For example, a highest protection level may be selected for a face recognition service scenario. To be specific, all AI security policies may be selected. In a normal image recognition scenario, only the AI operator library code needs to be verified.

In this implementation, the AI processing apparatus executes, in a process of processing the AI processing request, the security policy corresponding to the AI processing request. This can meet the security processing requirements of different AI processing requests.

Figure 5:
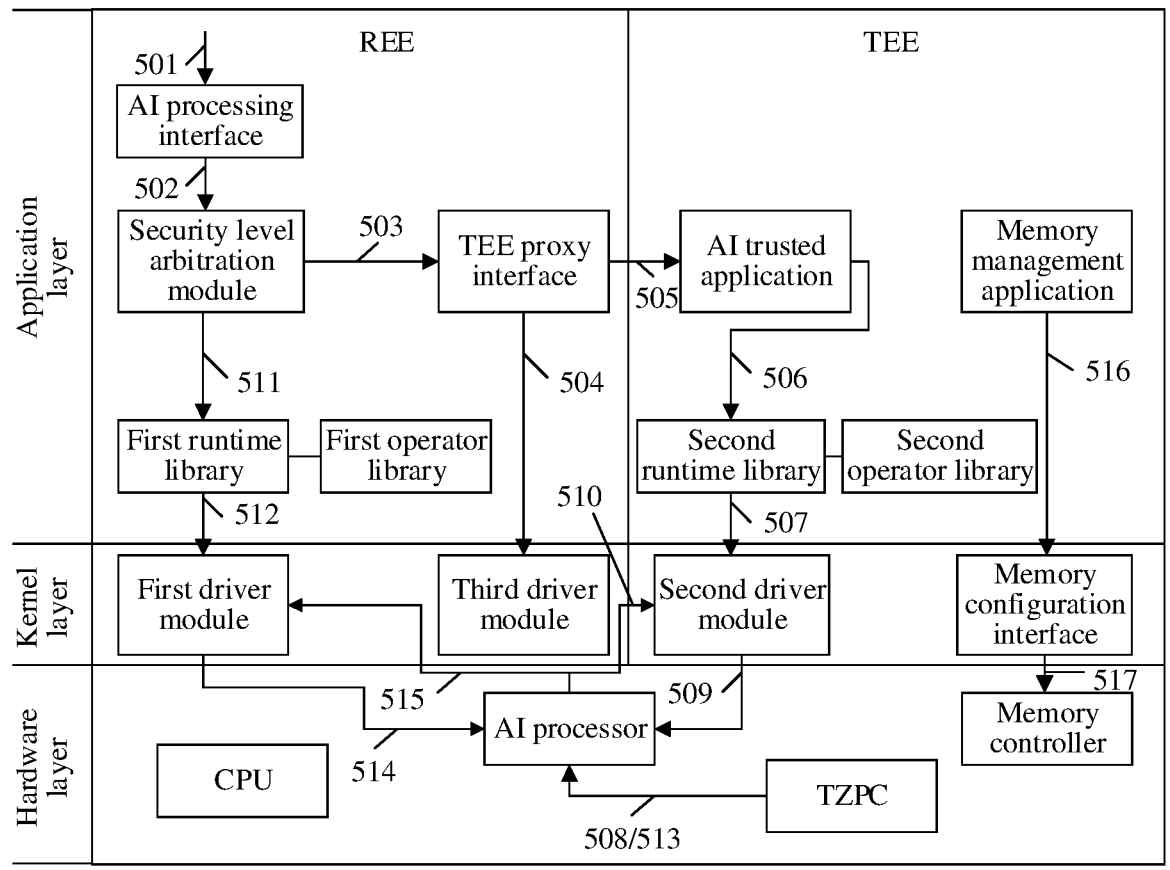
FIG. 5 is a flowchart of another AI processing method according to this application.

Based on the system architecture in FIG. 1, this application provides another AI processing method. As shown in FIG. 5, the method may include the following steps.

501: An AI processing apparatus receives an AI processing request through an AI processing interface in an REE.

In actual application, an AI application sends the AI processing request to the AI processing interface.

502: The AI processing interface sends the AI processing request to a security level arbitration module.

503: When determining that the AI processing request corresponds to a second mode of an AI processor, the security level arbitration module sends the AI processing request to a TEE proxy interface.

A working mode of the AI processor includes a first mode and the second mode, and security of the second mode is higher than security of the first mode.

504: A third driver module receives a switching instruction sent by the TEE proxy interface, and switches an execution environment from the REE to a TEE.

505: The TEE proxy interface sends the AI processing request to an AI trusted application.

506: The AI trusted application determines, by using a second runtime library and a second operator library, first data required to process the AI processing request.

The first data may include an AI model and AI operator library code that are required to process the AI processing request, and data required for providing runtime support for the AI processor.

507: A second driver module obtains the first data.

508: The CPU sets the working mode of the AI processor to the second mode by using a TZPC.

509: The second driver module loads the first data to the AI processor, and initiates the AI processing request to the AI processor.

510: The AI processor processes the AI processing request in the second mode by using the first data.

Optionally, after completing processing, the AI processor clears data stored in the AI processor and is powered off.

Optionally, 511: When determining that the AI processing request corresponds to the first mode, the security level arbitration module forwards the AI processing request to a first runtime library.

512: A first driver module obtains second data that is determined by using the first runtime library and a first operator library and that is required to process the AI processing request.

The second data may include an AI model and AI operator library code that are required to process the AI processing request, and data required for providing runtime support for the AI processor.

513: The CPU sets the working mode of the AI processor to the first mode by using the TZPC.

514: The first driver module loads the second data to the AI processor, and initiates the AI processing request to the AI processor.

515: The AI processor processes the AI processing request by using the second data and returns a processing result in the first mode.

The AI application is an application that initiates the AI processing request. After completing processing of the AI processing request, the AI processor clears data, and is powered off.

Optionally, before processing the AI processing request in the TEE, the AI processing apparatus may apply for a memory resource in the REE, and set access permission for the applied memory resource. To be specific, the AI processing method may further include:

516: A memory management application sends information about the applied memory resource and access permission configuration information to a memory configuration interface.

517: A memory controller configures the access permission for the applied memory resource based on the access permission configuration information received through the memory configuration interface.

The AI processing apparatus processes the AI processing request by using the applied memory resource. When the AI processor processes an AI processing request with a relatively high security requirement, secure memories need to be applied for both input data and output data, and the data cannot leave a security domain.

As shown in FIG. 5, a unified service request entry, namely, the AI processing interface, is provided in the REE, and AI processing requests are received through the service request entry. The security level arbitration module distributes the AI processing requests. Some AI processing requests are directed to the REE for processing, and the other AI processing requests are directed to the TEE for processing. A control procedure of the AI processing method is completed on an REE side, and a data processing procedure is completed on a TEE side. This can reduce load on the TEE side. Optionally, after receiving the AI processing request, the security level arbitration module determines a service type requested by the AI processing request. A processing procedure is used based on the service type requested by the AI processing request. For example, when the service type requested by the AI processing request is a payment type or an unlocking type, a TEE security service is requested through the TEE proxy interface. To be specific, the AI processing request is processed in the TEE. For another example, when the service type requested by the AI processing request is a normal type, all processing procedures are completed on the REE side. It may be learned from FIG. 5 that, the AI processing apparatus uses a unified architecture and a unified upper-layer interface to process AI processing requests with different security requirements (different service types), to improve compatibility and maintainability. An upper-layer application does not need to pay attention to service security, and only needs to invoke a unified interface to process a service request.

All steps other than 510 and 515 of the method in FIG. 5 are performed by the CPU.

In this application, the AI processor processes the AI processing request in a target mode corresponding to the AI processing request, to meet security processing requirements of different AI processing requests, and improve security.

In the foregoing embodiment, the AI processing apparatus sets the working mode of the AI processor to meet the security processing requirements of different AI processing requests. In actual application, another security policy corresponding to the working mode of the AI processor may be further used to further improve security.

Figure 6:
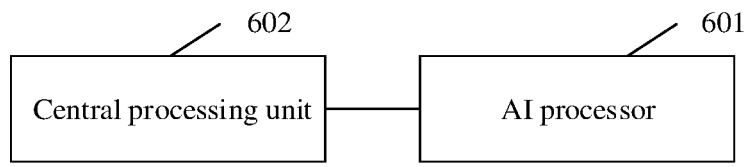
FIG. 6 is a schematic structural diagram of an AI processing apparatus according to this application.

FIG. 6 is a schematic structural diagram of an AI processing apparatus according to this application. As shown in FIG. 6, the AI processing apparatus includes:

an AI processor 601, configured to process an AI processing request in a target mode, where the AI processor has at least two working modes, security of the at least two working modes is different, the target mode is one of the at least two working modes, and the target mode is a working mode determined based on the AI processing request.

The AI processor 601 may be an AI chip, an NPU, a GPU, a CPU, or the like, or may be an AI chip or an NPU integrated into a CPU or a GPU.

In this application, the AI processor processes the AI processing request in the target mode corresponding to the AI processing request, to meet security processing requirements of different AI processing requests, and improve security.

In an optional implementation, the AI processing apparatus further includes:

a central processing unit CPU 602, configured to receive the AI processing request, and determine the target mode corresponding to the AI processing request.

In this implementation, the CPU determines the target mode corresponding to the AI processing request, so that the AI processor processes the AI processing request in the target mode. This implementation is simple.

In an optional implementation, the CPU 602 is further configured to set the working mode of the AI processor to the target mode.

In this implementation, a working mode of internal components of the AI processor is set to the target mode corresponding to the AI processing request, so that the AI processor processes the AI processing request in the target mode. This implementation is simple.

In an optional implementation, the CPU 602 is specifically configured to set the working mode of the internal components of the AI processor to the target mode by using a TrustZone protection controller (TZPC).

In this implementation, the working mode of the internal components of the AI processor can be quickly set to the target mode by using the TZPC. This implementation is simple.

In an optional implementation, the CPU 602 is specifically configured to determine, based on a service type requested by the AI processing request, the target mode corresponding to the AI processing request.

Alternatively, the CPU is specifically configured to determine, based on a type of service data carried in the AI processing request, the target mode corresponding to the AI processing request.

In this implementation, the target mode corresponding to the AI processing request can be quickly determined. This implementation is simple.

In an optional implementation, the CPU 602 is further configured to initiate the AI processing request to the AI processor.

In an optional implementation, the AI processing apparatus supports a rich execution environment REE and a trusted execution environment TEE.

The CPU 602 is specifically configured to determine a case in which the target mode is a first mode, and initiate the AI processing request to the AI processor by using a driver in the TEE.

The CPU 602 is specifically configured to determine a case in which the target mode is a second mode, and initiate the AI processing request to the AI processor by using a driver in the REE. Security of the AI processor in the first mode is higher than security of the AI processor in the second mode.

In this implementation, the AI processing request is initiated to the AI processor by using a driver corresponding to the target mode corresponding to the AI processing request, so that both efficiency and security of processing the AI processing request can be considered.

In an optional implementation, the CPU 602 is further configured to determine an AI model and AI operator library code that are required to process the AI processing request, and load the AI model and the AI operator library code to the AI processor.

The AI processor 601 is specifically configured to process the AI processing request by using the AI model and the AI operator library code.

In this implementation, the AI model and the AI operator library code that are required to process the AI processing request are loaded to the AI processor, so that the AI processor processes the AI processing request by using the AI model and the AI operator library code. This implementation is simple.

In an optional implementation, the CPU 602 is further configured to: when a running environment of the CPU is the REE, switch the running environment from the REE to the TEE.

In this implementation, the CPU switches the running environment from the REE to the TEE, to initiate the AI processing request to the AI processor by using the driver in the TEE. This can improve security of processing the AI processing request.

In an optional implementation, the CPU 602 is further configured to: when a running environment of the CPU is the TEE, switch the running environment from the TEE to the REE.

In this implementation, the CPU switches the running environment from the TEE to the REE, to initiate the AI processing request to the AI processor by using the driver in the REE. This can fully use a resource in the REE, and increase resource utilization.

In an optional implementation, the CPU 602 is further configured to apply for storage space required to process the AI processing request, and set, by using a memory controller, access permission for the storage space as target access permission. The target access permission is access permission determined based on the service type requested by the AI processing request.

The AI processor 601 is specifically configured to process the AI processing request in the target mode by using the storage space.

In this implementation, the AI processing apparatus sets, based on the service type requested by the AI processing request, the access permission for the storage space required to process the AI processing request. An operation is simple, and security can be further improved.

Figure 7:
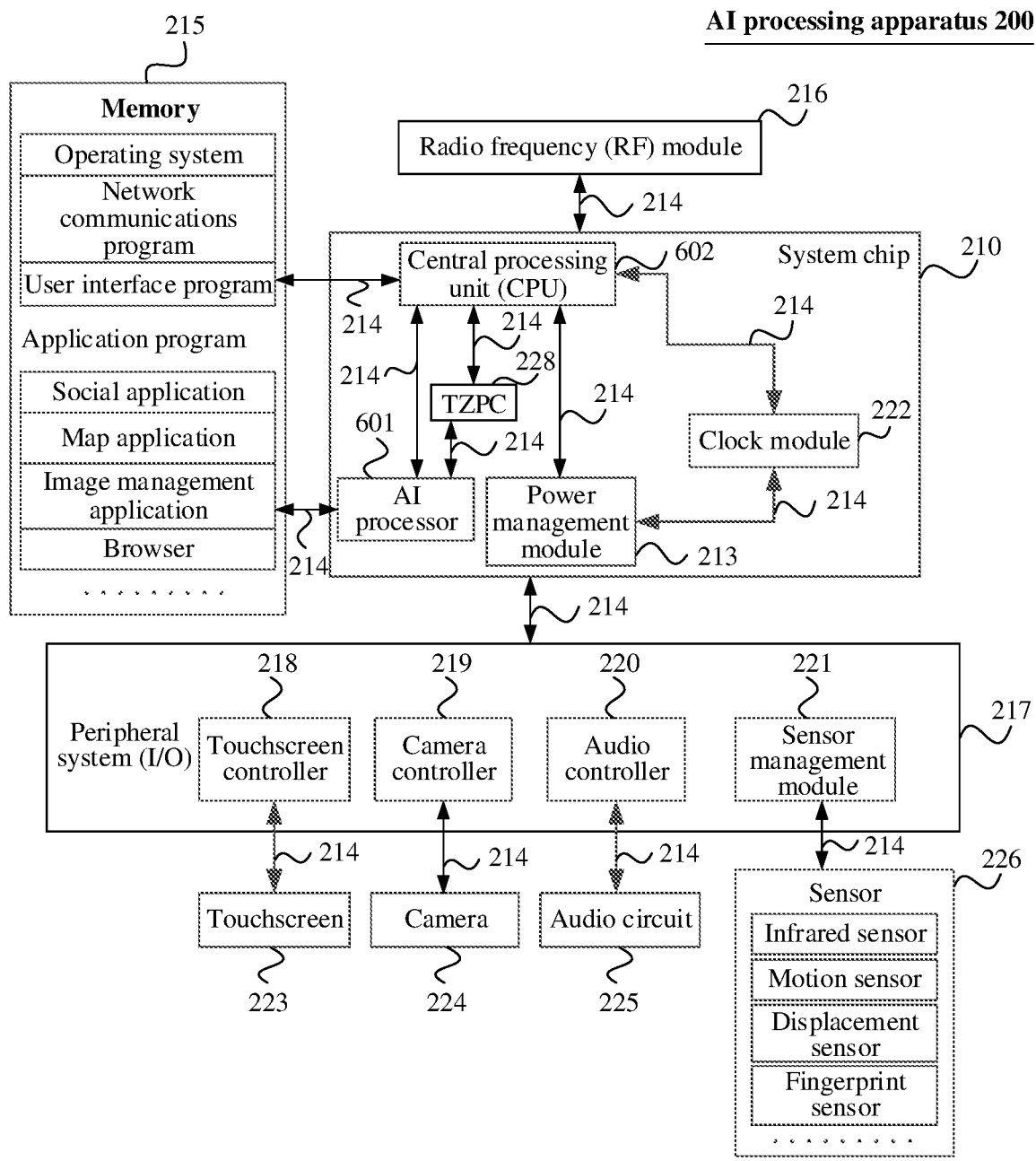
FIG. 7 is a schematic structural diagram of another AI processing apparatus according to this application.

FIG. 7 is a schematic structural diagram of an AI processing apparatus according to this application. As shown in FIG. 7, an AI processing apparatus 200 may include a system chip 210, a memory 215 (one or more computer-readable storage media), a radio frequency (RF) module 216, and a peripheral system 217. These components may communicate with each other on one or more communications buses 214.

The peripheral system 217 is mainly configured to implement an interaction function between the AI processing apparatus 200 and a user/an external environment, and mainly includes an input/output apparatus of the AI processing apparatus 200. In a specific implementation, the peripheral system 217 may include a touchscreen controller 218, a camera controller 219, an audio controller 220, and a sensor management module 221. The controllers may be coupled to respective corresponding peripheral devices (such as a touchscreen 223, a camera 224, an audio circuit 225, and a sensor 226). It should be noted that the peripheral system 217 may further include another I/O peripheral device.

The system chip 210 may include a central processing unit 602, an AI processor 601, a TZPC 228, a clock module 222, and a power management module 213. A core of the central processing unit 602 is provided with two virtual cores. One virtual core is configured to perform an operation in a trusted execution environment (TEE), and is referred to as a secure core. The other virtual core is configured to perform an operation in a non-security environment, and is referred to as a non-secure core. Different virtual cores use their own resources, to be specific, use their respective resources in different operating environments. The clock module 222 integrated in the system chip 210 is mainly configured to generate a clock required for data transmission and time sequence control for the central processing unit 602. The power management module 213 integrated in the system chip 210 is mainly configured to provide a stable and high-precision voltage for the central processing unit 602, the radio frequency module 216, and the peripheral system. The AI processor 601 is configured to perform AI computing. The TZPC 228 is configured to configure a working mode of internal components of the AI processor 601, to be specific, switch a security state of the AI processor. For example, the AI processor is switched from the non-security environment to the trusted execution environment or the AI processor is switched from the trusted execution environment to the non-security environment. The buses 214 in this embodiment may include various types of buses such as a serial bus, a parallel bus, an inter-integrated circuit (I2C) bus, and a peripheral component interconnect express (PCIe) bus, and are configured to couple different components or modules in the system. The system chip 210 in this embodiment is merely an example, and a plurality of components or functions inside the system chip 210 may be replaced by a plurality of chips or other separate components.

The radio frequency (RF) module 216 is configured to receive and send radio frequency signals, and mainly integrates a receiver and a transmitter of the AI processing apparatus 200. The radio frequency (RF) module 216 communicates with a communications network and another communications device by using a radio frequency signal. In a specific implementation, the radio frequency (RF) module 216 may include but is not limited to: an antenna system, an RF transceiver, one or more amplifiers, a tuner, one or more oscillators, a digital signal processor, a codec chip, a SIM card, a storage medium, and the like. In some embodiments, the radio frequency (RF) module 216 may be implemented on an independent chip.

The memory 215 is coupled to the central processing unit 602, and is configured to store various software programs and/or a plurality of sets of instructions. In a specific implementation, the memory 215 may include a high-speed random access memory, and may further include a nonvolatile memory, for example, one or more magnetic disk storage devices, a flash storage device, or another nonvolatile solid-state storage device. The memory 215 may store an operating system (a system for short below), for example, an embedded operating system such as Android, iOS, Windows, or Linux. The memory 215 may further store a network communications program. The network communications program may be used to communicate with one or more additional devices, one or more AI processing devices, or one or more network devices. The memory 215 may further store a user interface program. The user interface program may vividly display content of an application program by using a graphical operation interface, and receive, by using input controls such as a menu, a dialog box, and a button, a control operation performed by a user on the application program.

The memory 215 may further store one or more application programs. As shown in FIG. 7, these application programs may include a social application program (for example, Facebook), an image management application program (for example, an album), a map application program (for example, Google map), a browser (for example, Safari or Google Chrome), and the like.

In this application, the central processing unit 602 may be configured to read and execute a computer-readable instruction. Specifically, the central processing unit 602 may be configured to invoke a program stored in the memory 215, and execute an instruction included in the program.

It should be understood that the AI processing apparatus 200 is merely an example provided in this embodiment of the present invention. In addition, the AI processing apparatus 200 may include more or fewer components than shown components, or may combine two or more components, or may have different component configurations.

An embodiment of the present invention provides a computer-readable storage medium. The computer-readable storage medium stores a computer program, and the computer program includes a program instruction. A processor executes the program instruction, to receive an AI processing request; determine a target mode corresponding to the AI processing request, where the target mode is one of at least two working modes that are of the AI processor and that have different security; and process the AI processing request in the target mode.

All or some of the embodiments may be implemented by using software, hardware, firmware, or any combination thereof. When software is used to implement the embodiments, the embodiments may be implemented all or partially in a form of a computer program product. The computer program product includes one or more computer instructions. When the computer instructions are loaded or executed on the AI processing apparatus, the procedures or functions according to the embodiments of the present invention are all or partially generated. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   receiving, by a central processing unit (CPU) of an artificial intelligence (AI) processing apparatus, an AI processing request, wherein the AI processing apparatus comprises a hardware layer including an AI processor and the CPU, wherein the AI processor is a neural processing unit (NPU) or a graphics processing unit (GPU), wherein each of the CPU and the AI processor has at least two working modes and can switch between the at least two working modes, and wherein security of the at least two working modes is different;
   determining, by the CPU, a target mode corresponding to the AI processing request, wherein the target mode is one of the at least two working modes, wherein the AI processing request includes information for AI processing, and wherein the target mode of the AI processor is determined based on the information for AI processing corresponding to the target mode;
   executing, by the CPU, a security policy corresponding to the target mode; and
   processing, by the AI processor, the AI processing request in the target mode.

2. The method according to claim 1, wherein the AI processing apparatus further comprises a controller connected to the AI processor, and the method further comprises:
   before the processing the AI processing request in the target mode:
      receiving, by the controller, the AI processing request; and
      determining, by the controller, the target mode corresponding to the AI processing request.

3. The method according to claim 2, wherein the determining, by the controller, the target mode corresponding to the AI processing request comprises:
   determining, by the controller based on a service type requested by the AI processing request, the target mode corresponding to the AI processing request.

4. The method according to claim 2, wherein the determining, by the controller, the target mode corresponding to the AI processing request comprises:
   determining, by the controller based on a type of service data carried in the AI processing request, the target mode corresponding to the AI processing request.

5. The method according to claim 2, wherein the method further comprises:
   before the processing the AI processing request in the target mode:
      setting, by the controller, a working mode of the AI processor to the target mode.

6. The method according to claim 2, wherein the AI processing apparatus supports a rich execution environment (REE) and a trusted execution environment (TEE), and the method further comprises:
   when the target mode is a first mode, initiating, by the controller, the AI processing request to the AI processor by using a first driver in the TEE; and
   when the target mode is a second mode, initiating, by the controller, the AI processing request to the AI processor by using a second driver in the REE, wherein security of the AI processor in the first mode is higher than security of the AI processor in the second mode.

7. The method according to claim 6, wherein the method further comprises:
before the initiating the AI processing request to the AI processor by using the first driver in the TEE:
when a running environment of the controller is the REE, switching, by the controller, the running environment from the REE to the TEE.

8. The method according to claim 6, wherein the method further comprises:
before the initiating, by the controller, the AI processing request to the AI processor by using the second driver in the REE:
when a running environment of the controller is the TEE, switching, by the controller, the running environment from the TEE to the REE.

9. The method according to claim 2, wherein the method further comprises:
before the processing, by the AI processor, the AI processing request in the target mode:
applying, by the CPU, for storage space required to process the AI processing request; and
setting, by the CPU, access permission for the storage space as target access permission by using a memory controller, wherein the target access permission is determined based on a service type requested by the AI processing request,
wherein the processing the AI processing request in the target mode comprises:
processing, by the AI processor, the AI processing request in the target mode by using the storage space.

10. The method of claim 1, wherein the at least two working modes include three working modes, and wherein the AI processor processes the AI processing request in the target mode by using a corresponding AI model and a corresponding AI operator library code for the target mode.

11. An artificial intelligence (AI) processing apparatus, comprising:
a hardware layer including a hardware AI processor and a central processing unit (CPU), wherein the hardware AI processor is a neural processing unit (NPU) or a graphics processing unit (GPU), wherein each of the CPU and the hardware AI processor has at least two working modes and can switch between the at least two working modes, and wherein security of the at least two working modes is different,
wherein the CPU is configured to:
receive an AI processing request;
determine a target mode corresponding to the AI processing request, wherein the target mode is one of the at least two working modes, wherein the AI processing request includes information for AI processing, and wherein the target mode of the AI processor is determined based on the information for AI processing corresponding to the target mode; and
execute a security policy corresponding to the target mode, and
wherein the hardware AI processor is configured to:
process the AI processing request in the target mode.

12. The AI processing apparatus according to claim 11, wherein the AI processing apparatus further comprises:
a controller connected to the hardware AI processor, configured to:
receive the AI processing request, and
determine the target mode corresponding to the AI processing request.

13. The AI processing apparatus according to claim 12, wherein the controller is configured to:
determine, based on a service type requested by the AI processing request, the target mode corresponding to the AI processing request.

14. The AI processing apparatus according to claim 12, wherein the controller is configured to:
determine, based on a type of service data carried in the AI processing request, the target mode corresponding to the AI processing request.

15. The AI processing apparatus according to claim 12, wherein the controller is further configured to:
set a working mode of the hardware AI processor to the target mode.

16. The AI processing apparatus according to claim 12, wherein the AI processing apparatus supports a rich execution environment (REE) and a trusted execution environment (TEE), and the controller is configured to:
when the target mode is a first mode, initiate the AI processing request to the hardware AI processor by using a first driver in the TEE, and
when the target mode is a second mode, initiate the AI processing request to the hardware AI processor by using a second driver in the REE, wherein security of the hardware AI processor in the first mode is higher than security of the hardware AI processor in the second mode.

17. The AI processing apparatus according to claim 16, wherein the controller is further configured to:
when a running environment of the controller is the REE, switch the running environment from the REE to the TEE.

18. The AI processing apparatus according to claim 16, wherein the controller is further configured to:
when a running environment of the controller is the TEE, switch the running environment from the TEE to the REE.

19. The AI processing apparatus according to claim 12, wherein the AI processing apparatus further comprises a memory controller, and the CPU is further configured to:
apply for storage space required to process the AI processing request, and
set, by using the memory controller, access permission for the storage space as target access permission, wherein the target access permission is determined based on a service type requested by the AI processing request, and
wherein the hardware AI processor is configured to:
process the AI processing request in the target mode by using the storage space.

20. A non-transitory computer-readable storage medium having instructions stored thereon that, when executed by an artificial intelligence (AI) processing apparatus, cause the AI processing apparatus to perform operations, the operations comprising:
receiving, by a central processing unit (CPU), an AI processing request, wherein the AI processing apparatus comprises a hardware layer including an AI processor and the CPU, wherein the AI processor is a neural processing unit (NPU) or a graphics processing unit (GPU), wherein each of the CPU and the AI processor has at least two working modes and can switch between the at least two working modes, and wherein security of the at least two working modes is different;
determining, by the CPU, a target mode corresponding to the AI processing request, wherein the target mode is one of the at least two working modes, wherein the AI processing request includes information for AI processing, and wherein the target mode of the AI processor is determined based on the information for AI processing corresponding to the target mode;

executing, by the CPU, a security policy corresponding to the target mode; and processing, by the AI processor, the AI processing request in the target mode.

21. The non-transitory computer-readable storage medium according to claim 20, the operations further comprising:

before the processing the AI processing request in the target mode:

receiving, by a controller of the AI processing apparatus, the AI processing request, the controller connected to the AI processor; and determining, by the controller, the target mode corresponding to the AI processing request.

* * * * *

UNITED STATES PATENT AND TRADEMARK OFFICE
CERTIFICATE OF CORRECTION

| | |
|---|---|
| PATENT NO. | : 11,954,204 B2 |
| APPLICATION NO. | : 17/172804 |
| DATED | : April 9, 2024 |
| INVENTOR(S) | : Jianyong Zhang |

It is certified that error appears in the above-identified patent and that said Letters Patent is hereby corrected as shown below:

In the Claims

In Column 28, in Claim 19, Line 40, after "is" delete "further".

Signed and Sealed this
Fourteenth Day of May, 2024

Katherine Kelly Vidal
*Director of the United States Patent and Trademark Office*